United States Patent [19]

Bademian

[11] Patent Number: 4,516,838
[45] Date of Patent: May 14, 1985

[54] OVERLAPPING ELECTRODE STRUCTURE FOR MULTI-CHANNEL ACOUSTO-OPTIC DEVICES

[75] Inventor: Leon Bademian, Vienna, Va.

[73] Assignee: Isomet Corporation, Springfield, Va.

[21] Appl. No.: 536,005

[22] Filed: Sep. 26, 1983

[51] Int. Cl.³ .......................... G02F 1/11; G02F 1/33
[52] U.S. Cl. .................................... 350/358; 350/392
[58] Field of Search .................. 350/358, 371–373, 350/392

[56] References Cited

U.S. PATENT DOCUMENTS

| | | | |
|---|---|---|---|
| 3,633,995 | 1/1972 | Lean et al. | 350/161 |
| 3,698,794 | 10/1972 | Alphonse | 350/161 |
| 3,707,323 | 12/1972 | Kessler et al. | 350/161 |
| 3,731,231 | 5/1973 | Torguet | 350/358 |
| 3,744,039 | 7/1973 | Hrbek et al. | 340/173 |
| 3,964,825 | 6/1976 | Eschler | 350/161 |
| 4,054,367 | 10/1977 | Eschler et al. | 350/150 |
| 4,090,204 | 5/1978 | Farhat | 343/754 |
| 4,332,441 | 6/1982 | Frosch | 350/358 |
| 4,432,613 | 2/1984 | Ueda et al. | 350/358 |

FOREIGN PATENT DOCUMENTS

| | | | |
|---|---|---|---|
| 968446 | 5/1975 | Canada | 350/392 |
| 124013 | 10/1978 | Japan | 350/392 |

OTHER PUBLICATIONS

Richardson et al., "Acoustical Arrays with Nonuniform Element Spacing and/or Elevation", Abstract, IEEE Trans. on Sonics & Ultrasonics, 9-1981, p. 386.

Cook, et al., "A Numerical Procedure for Calculating the Integrated Acoustooptic Effect", IEEE Transactions on Sonics & Ultrasonics, vol. SU 27, No. 4, Jul. 1980.

Cook, "A Procedure for Calculating the Integrated Acousto-Optic (RAMAN-NATH) Parameter for the Entire Sound Field", 1979 Ultrasonics Symposium, IEEE, pp. 90-93.

Ingenito et al., "Theoretical Investigation of the Integrated Optical Effect Produced by Sound Fields Radiated from Plane Piston Transducers," Journal of the Acoustical Society of America, vol. 45, No. 3, 1969, pp. 572-577.

*Primary Examiner*—William H. Punter
*Attorney, Agent, or Firm*—Shapiro and Shapiro

[57] ABSTRACT

Apparatus for acousto-optic interaction comprising a body of acousto-optic material through which a beam of light is to be directed and an acoustic energy generator mounted on the body for creating columns of acoustic energy within the body, the acoustic energy generator including a plurality of overlapping electrodes for producing a series of overlapping diffracted light beams.

14 Claims, 4 Drawing Figures

OVERLAPPING ELECTRODE STRUCTURE FOR MULTI-CHANNEL ACOUSTO-OPTIC DEVICES

BACKGROUND OF THE INVENTION

This invention relates to acousto-optic interaction devices, and is more particularly concerned with a novel multi-channel acoustic transducer electrode structure for bulk wave acousto-optic devices.

Bulk wave acousto-optic devices are generally well known. Broadly speaking, these devices typically comprise a body of acousto-optic material having a transducer mounted thereon for generating acoustic waves within the body. When a light beam, such as from a laser, is directed through the device at an appropriate angle of incidence, the beam is diffracted by the device. The path of the diffracted beam can be controlled by varying the acoustic frequency.

In practice, an incident light beam nearly always passes through the near field (the so-called "Fresnel zone") of the transducer. Because of the complex characteristics of the acoustic field within the Fresnel zone, a light beam may encounter different numbers of peaks and valleys in the field depending on the position of its path of travel beneath the transducer. The overall diffraction effect of these peaks and valleys (i.e., the Integrated Optical Effect) on an incident beam can vary significantly with location beneath the transducer. This variation in Integrated Optical Effect impairs the smoothness of the diffracted output beam and is deleterious in many (if not most) acousto-optic applications.

Cook et al have shown that by proper shaping of the transducer electrode, the Integrated Optical Effect on an incident beam in the Fresnel zone will be substantially the same regardless of the position of the beam under the electrode, thereby providing a smooth output beam. See Cook, Cavanaugh, and Dardy, "A Numerical Procedure For Calculating The Integrated Acoustooptic Effect," *IEEE Transactions on Sonics and Ultrasonics*, Vol. SU 27, No. 4, July, 1980. Cook et al further provided a method for calculating the Integrated Optical Effect for any individual electrode structure. Ibid. Applying this methodology it can readily be demonstrated that more than one electrode shape can yield the same Integrated Optical Effect. The present invention takes advantage of the foregoing factors in connection with multi-channel acousto-optic applications.

In multi-channel acousto-optic applications it is frequently desirable to control a plurality of uniform, overlapping diffracted beams at some image plane. Heretofore, there has been no simple and effective means for providing such output from a single bulk wave device. The incorporation of these devices in such multi-channel applications has thus tended to result in acousto-optic systems of considerable complexity. Current color separator systems, for example, may use as many as ten acousto-optic modulators to expose color film. The desired exposure is obtained by providing special means to combine the individual modulator output beams with the required degree of overlap in the film plane.

The present invention avoids such complexities and other disadvantages of the prior art.

SUMMARY OF THE INVENTION

In accordance with the invention, it has been discovered that by correctly positioning a plurality of electrodes having the same Integrated Optical Effect, a series of uniform, overlapping diffracted beams may be obtained directly from a single acousto-optic device.

More specifically, according to a broad aspect of the invention, an acousto-optic device may comprise a body of acousto-optic material through which a beam of light is to be directed and means mounted on the body for generating a plurality of acoustic energy columns therein. The generating means may include a plurality of electrodes arranged successively along a line transverse to the direction of the light beam, the plurality including adjacent electrodes positioned in such a manner that projections of portions thereof on the line overlap.

In accordance with another aspect of the invention, electrode overlap may be accomplished by nesting complementarily shaped electrodes.

In accordance with a further aspect of the invention, the electrodes may be positioned so that the diffracted beams merge at a final image plane, essentially forming a line.

The features and advantages of the invention will be further understood from the description of a preferred embodiment below with reference to the accompanying drawing.

DETAILED DESCRIPTION OF THE INVENTION

Figure 1:
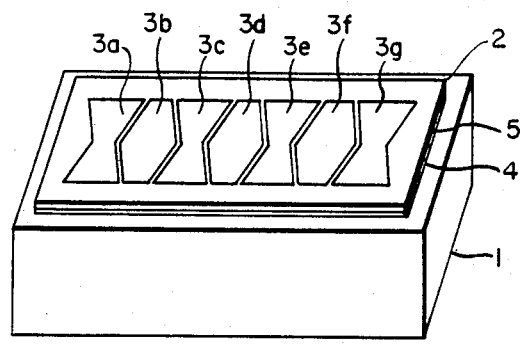
FIG. 1 is a perspective view of an acousto-optic device employing an overlapping electrode arrangement in accordance with the present invention.

FIG. 1 depicts a bulk wave acousto-optic device employing a preferred overlapping electrode arrangement according to the invention. As illustrated in FIG. 1, a bulk wave acousto-optic device may comprise a body of acousto-optic interaction material 1 having at one side thereof acoustic energy generating means 2 for creating columns of acoustic energy within the body. In the form shown, body 1 is a rectangular block of conventional acousto-optic interaction material and acoustic energy generator 2 is an ultrasonic transducer comprising overlapping control electrodes 3a–3g, a common electrode 4 and a piezoelectric wafer 5 intermediate electrodes 3a–3g and common electrode 4, all mounted on a face of body 1. Electrodes 3a–3g may be connected through switches to excitation means (not shown), such as an oscillator, to permit the creation of seven columns of acoustic energy within the acousto-optic body 1—one column corresponding to each of the electrodes 3a–3g.

The overlapping of electrodes 3a–3g is achieved through the use of complementary electrode configurations (in this case, concave and convex bitrapezoids) which permit adjacent electrodes to be nested as shown. The concept of electrode overlap according to the invention will be discussed in detail later. It should be noted that while the illustrated embodiment of the invention incorporates seven overlapping electrodes, any number of electrodes may be used as is suitable for a particular application.

To obtain a series of uniform, overlapping diffracted beams from a device such as that shown in FIG. 1, two features are particularly desirable. First, the electrode shapes selected should be capable of producing a smooth output beam (i.e., the Integrated Optical Effect on an incident light beam should be substantially the same regardless of the location of the beam path beneath the electrode). Second, the electrodes should produce the same Integrated Optical Effect so that the Integrated Optical Effect across the entire electrode structure is uniform. It has been determined that the complementary concave and convex bitrapezoidal electrodes shown in FIG. 1 meet the foregoing considerations in a superior manner.

Figure 2:
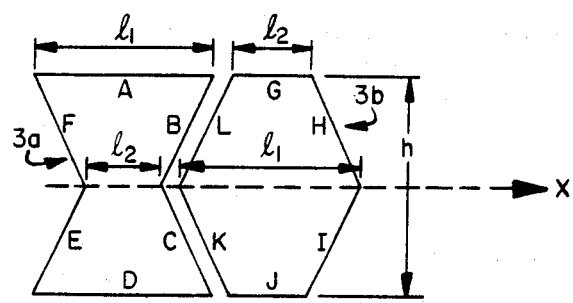
FIG. 2 is a plan view of two overlapping electrodes according to the invention.

FIG. 2 illustrates these electrode configurations more closely. Specifically, FIG. 2 shows the general arrangement of adjacent electrodes 3a and 3b (the remaining electrodes being arranged similarly). In the form shown, electrodes 3a and 3b are concave and convex symmetric bitrapezoids, respectively, both of height h and having a common center line x. More particularly, electrode 3a includes two base sides A and D of equal length l1, both parallel to the center line x. Electrode 3a further includes four sides B, C, E, and F also of equal length. Sides B and C are tapered inwardly and extend respectively from opposing ends of sides A and D as shown, joining at the center line x. Similarly, sides E and F are tapered inwardly and extend respectively from the remaining opposing ends of sides D and A, joining at the center line x. The chord length of electrode 3a along the center line x is l2.

Electrode 3b includes two base sides G and J, both of length l2 and parallel to the center line x. Electrode 3b also includes four sides, H, I, K, and L, all of equal length. As shown in FIG. 2, sides H and I are tapered outwardly and extend respectively from opposing ends of sides G and J, joining at the center line x. Similarly, sides K and L are tapered outwardly and extend respectively from the remaining opposing ends of sides J and G, joining at the center line x. The chord length of electrode 3b along the center line x is l1.

It is readily demonstrated by applying the methodology in Cook et al, supra, that electrodes 3a and 3b produce the same Integrated Optical Effect. In addition, the particular effect achieved with these electrodes can be varied simply by changing the ratio of l1 to l2.

Figure 3:
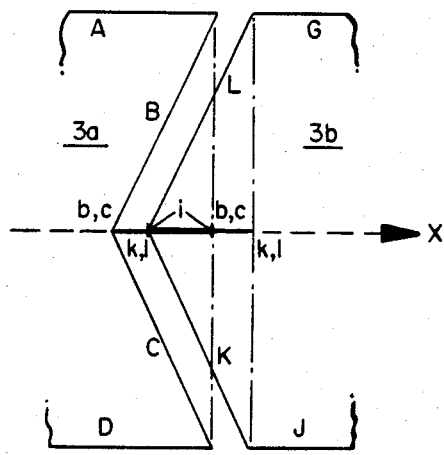
FIG. 3 is an enlarged fragmentary view of the adjacent sides of the electrodes shown in FIG. 2.

The concept of electrode overlap in accordance with the invention will now be explained with reference to FIG. 3, which illustrates the preferred overlap arrangement for the two bitrapezoidal electrodes 3a and 3b. It is assumed for the purposes of discussion that a light beam is to be directed beneath the electrodes in a direction substantially perpendicular to the center line x.

With the illustrated electrode configurations, it is preferable to achieve overlap by nesting the electrodes along the center line x as shown so that the projections on center line x of adjacent sides B and L and C and K overlap. The projections of sides B and C of electrode 3a on center line x (which are identical in the present example) are represented by the line segment b,c—b,c. Similarly, the projections of sides K and L of electrode 3b (also identical in this example) are represented by the segment k,l—k,l. The positions of electrodes 3a and 3b are such that the projections of adjacent sides B and L and C and K overlap in the region i as shown.

With the electrodes so positioned, the acoustic energy columns generated thereby will likewise overlap with respect to the direction of the light beam. Therefore, an incident light beam directed beneath the electrodes as noted above will pass in part through both acoustic-energy columns and thus be converted into two overlapping diffracted beams. The extent of overlap in the acoustic energy columns and the corresponding diffracted beams is determined by the length of the region i (i.e., the relative positions of the electrodes along center line x). It should be noted that while the illustrated electrode arrangement utilizes a common center line, a different nesting line may be used as is appropriate for a particular application and the electrode configurations selected.

Figure 4:
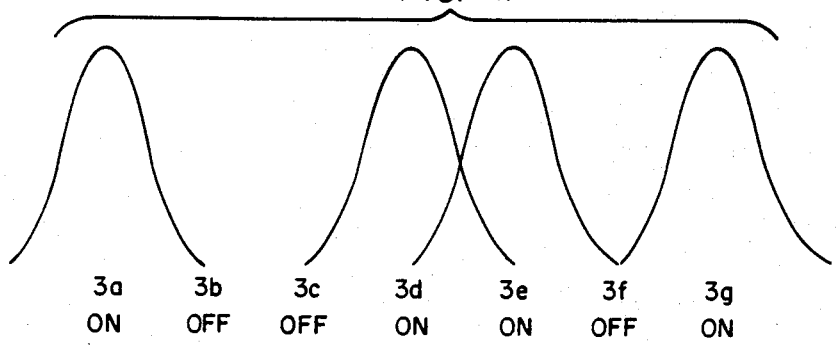
FIG. 4 is a diagrammatic representation of an example of an output from the device shown in FIG. 1 with selected electrodes energized.

FIG. 4 represents an example output from an acousto-optic device of the form shown in FIG. 1. More specifically, FIG. 4 illustrates diagrammatically the diffracted beam intensity distributions at an arbitrary image plane when a group of electrodes in the nested arrangement is selectively energized. For the purposes of FIG. 4, it has been assumed that electrodes 3a, 3d, 3e and 3g are energized (or turned "ON") as indicated and that a laser beam of substantially rectangular cross-section and of sufficient width to pass beneath the entire nested electrode arrangement is flashed through the device at a suitable angle for achieving diffraction, in a direction substantially perpendicular to the common electrode center line. The output intensity curve corresponding to each electrode is shown centered over the respective electrode designation in FIG. 4, the quasi-Gaussian curve shape being a result of the cross-section of the laser beam and the electrode configurations selected. It has further been assumed for the present example that electrodes 3a–3g are positioned so that the acoustic energy columns of adjacent electrodes and the corresponding diffracted beams overlap respectively at approximately their 50% intensity points (see the curves for electrodes 3d and 3e). With a 50% overlap at the final image plane, the diffracted beams from adjacent electrodes (which individually appear as dots) merge to appear essentially as a line.

FIG. 4 demonstrates that by selectively energizing electrodes 3a–3g, any combination of up to seven uniform, overlapping dots may be created at some image plane. This characteristic can be most useful in a variety of applications such as, for example, color separator systems. As noted previously, current color separator systems may require as many as ten acousto-optic modulators and special means for combining and overlapping the respective output beams to expose color film. A single overlapping electrode acousto-optic device could be used in such an application to replace the individual modulators and beam combination means.

While a preferred form of the invention has been shown and described, it will be apparent to those skilled in the art that various changes may be made without departing from the principles and spirit of the invention, the scope of which is defined in the appended claims. It will be apparent, for instance, that electrode overlap need not be obtained by nesting. For example, electrodes 3a and 3b referred to above could be offset along the direction of the incident beam (so that line x would no longer be a common center line) and the projections of sides B, C, K and L on line x would still overlap as shown. Thus an incident light beam would still pass in part through both acoustic energy columns and be converted into two overlapping diffracted beams. Alternatively, electrode overlap could be achieved without nesting simply by using single trapezoidal electrodes—such as the respective top halves of electrodes 3a and 3b positioned, for example, so that the projections of sides B and L on line x overlap as previously shown. It will also be apparent that two-dimensional arrays of overlapping electrodes are possible in accordance with the invention (such as by staggering rows of bitrapezoidal electrodes of one of the forms shown hereinabove). In addition, it will be further apparent that electrodes of shapes other than those discussed above, and that electrodes having different Integrated Optical Effects may be overlapped according to the invention.

The invention claimed is:

1. Apparatus for acousto-optic interaction, comprising a body of acousto-optic material through which a beam of light is to be directed and means mounted on said body for generating columns of acoustic energy therein, said generating means including a plurality of electrodes arranged successively along a line transverse to the direction of the light beam, said plurality including adjacent electrodes positioned in such a manner that projections of portions thereof on said line overlap, whereby said light beam is converted into a plurality of overlapping diffracted light beams.

2. Apparatus as recited in claim 1, wherein said adjacent electrodes produce substantially the same integrated optical effect.

3. Apparatus as defined in claim 2, wherein said adjacent electrodes are positioned so that the diffracted beams corresponding thereto overlap at about their 50% intensity points.

4. Apparatus as recited in claim 1, wherein said adjacent electrodes are nested.

5. Apparatus as recited in claim 4, wherein said adjacent electrodes have a common center line and produce substantially the same integrated optical effect.

6. Apparatus as recited in claim 5, wherein said adjacent electrodes are positioned so that the diffracted beams corresponding thereto overlap at about their 50% intensity points.

7. Apparatus as recited in claim 5, wherein said adjacent electrodes include a concave bitrapezoidal electrode and a convex bitrapezoidal electrode of equal height, each having two base sides parallel to said center line and equal in length to the chord of the other electrode along said center line.

8. Apparatus for acousto-optic interaction, comprising a body of acousto-optic material through which a beam of light is to be directed and an ultrasonic transducer mounted at one side of said body, said transducer having a layer of piezoelectric material disposed between a common electrode and a plurality of control electrodes, said plurality being arranged successively along a line transverse to the direction of the light beam and including adjacent electrodes positioned in such a manner that projections of portions thereof on said line overlap, whereby said light beam is converted into a plurality of diffracted light beams.

9. Apparatus as recited in claim 8, wherein said adjacent electrodes produce substantially the same integrated optical effect.

10. Apparatus as recited in claim 9, wherein said adjacent electrodes are positioned so that the diffracted beams corresponding thereto overlap at about their 50% intensity points.

11. Apparatus as recited in claim 8, wherein said adjacent electrodes are nested.

12. Apparatus as recited in claim 11, wherein said adjacent electrodes have a common center line and produce substantially the same integrated optical effect.

13. Apparatus as recited in claim 12, wherein said adjacent electrodes are positioned so that the diffracted beams corresponding thereto overlap at about their 50% intensity points.

14. Apparatus as recited in claim 12, wherein said adjacent electrodes include a concave bitrapezoidal electrode and a convex bitrapezoidal electrode of equal height, each having two base sides parallel to said center line and equal in length to the chord of the other electrode along said center line.

* * * * *